United States Patent [19]

Teumac et al.

[11] Patent Number: 5,248,731

[45] Date of Patent: * Sep. 28, 1993

[54] CALENDERABLE THERMOPLASTIC COMPOSITIONS CONTAINING MILLABLE LINEAR POLYURETHANES

[75] Inventors: Fred N. Teumac; John R. Damewood; Jill R. Menzel, all of Spartanburg, S.C.

[73] Assignee: Reeves Bros. Inc., Spartanburg, S.C.

[ * ] Notice: The portion of the term of this patent subsequent to Jul. 14, 2009 has been disclaimed.

[21] Appl. No.: 326,182

[22] Filed: Mar. 20, 1989

[51] Int. Cl.⁵ ............... C08L 75/00; C08L 77/00
[52] U.S. Cl. ............... 525/131; 525/424; 525/455; 525/457; 525/458
[58] Field of Search ............... 525/424, 131, 455, 458, 525/457

[56] References Cited

U.S. PATENT DOCUMENTS

| | | | |
|---|---|---|---|
| 3,043,807 | 7/1962 | Snyder et al. | 260/75 |
| 3,703,498 | 11/1972 | Harris | 260/75 NP |
| 3,926,826 | 12/1975 | Graham et al. | 252/62.54 |
| 3,935,132 | 1/1976 | Gerkin et al. | 260/2.5 BE |
| 4,261,946 | 4/1981 | Goyert et al. | 525/440 |
| 4,419,499 | 12/1983 | Coran et al. | 524/424 |
| 4,446,286 | 5/1984 | Kolycheck et al. | 525/455 |
| 4,483,900 | 11/1984 | Goldfarb | 428/262 |
| 4,560,611 | 12/1985 | Naka et al. | 428/266 |
| 4,619,955 | 10/1986 | Druetzler | 524/29 |
| 4,758,465 | 7/1988 | McKinney et al. | 428/252 |
| 4,889,915 | 12/1989 | Brauer | 525/458 |
| 4,965,034 | 10/1990 | Shaw et al. | 525/123 |

*Primary Examiner*—Ana L. Carrillo
*Attorney, Agent, or Firm*—Pennie & Edmonds

[57] ABSTRACT

Thermoplastic synthetic polymeric compositions of certain polyurethanes, polyamides or chlorinated polyolefins, having processing temperatures in the range of about 150° to 325° F., can be modified by the addition of a millable thermoplastic polyurethane elastomer thereto to lower the processing temperature by 10° to 30° F. or more. This modification enables the thermoplastic composition to be processed on conventional calendering or extrusion equipment with a lesser amount of energy or with better performance. Also, coated fabrics of such thermoplastic compositions and a fiber reinforcement.

14 Claims, 1 Drawing Sheet

CALENDERABLE THERMOPLASTIC COMPOSITIONS CONTAINING MILLABLE LINEAR POLYURETHANES

TECHNICAL FIELD

This invention relates to a method for lowering the processing temperature of hard to process thermoplastic materials so that they can be calendered on conventional rubber processing equipment. This invention can also be used for improving the processability of certain thermoplastic materials which are extruded or injection molded.

BACKGROUND ART

Blends of thermoplastic materials such as polyurethanes and polyvinyl chloride, nitrile rubber and polyvinyl chloride, and many other polymeric materials are well known and have been used for a variety of applications. Such blends are useful for applications such as coated fabrics, molded products, etc.; however many of these materials have relatively high processing temperatures and are difficult to handle for this reason. Specialized equipment is required for manufacturing these materials into a final product. If the processing temperatures of these thermoplastic materials could be reduced without sacrificing the performance of such materials, it would be possible for the manufacturer to obtain substantial savings in energy costs, or, for the same expenditure of energy, to obtain end products of higher quality more easily or more rapidly.

SUMMARY OF THE INVENTION

The invention relates to a thermoplastic composition having improved temperature processing characteristics comprising a thermoplastic synthetic polymeric material having a processing temperature in the range of between about 150° and 325° F.; and a millable linear thermplastic polyurethane elastomer in an amount sufficient to lower the processing temperature of the thermoplastic material by at least about 10° F. Generally, the thermoplastic material is a polyamide, polyolefin, or polyurethane, and is present in an amount of between about 5 and 95 weight percent. When the thermoplastic material is present in an amount of less than about 50 weight percent and the millable thermoplastic polyurethane elastomer is present in an amount of about 50 weight percent or more, the composition may further contain an agent for curing the linear thermoplastic millable polyurethane elastomer to improve the tensile strength properties of the overall composition. A particularly preferred composition has the thermoplastic material present in an amount of between about 70 and 90 weight percent and the polyurethane is present in an amount of between about 10 and 30 weight percent.

In order to achieve the desired results, the millable thermoplastic polyurethane elastomer generally includes at least one

moiety, as a pendent or extra linear group. This unsaturation may be characterized as an aliphatic, non-benzenoid

moiety. Also, it is advantageous to have this polyurethane present in an amount sufficient to reduce the processing temperature of the thermoplastic material by at least 15° to 20° F., and this can be achieved by utilizing the preferred ranges.

Another embodiment of the invention relates to a method for reducing the processing temperature of a thermoplastic synthetic polymeric material which is normally processable at a temperature between about 150° and 325° F. which comprises adding thereto a millable thermoplastic polyurethane elastomer in an amount sufficient to reduce the processing temperature of the thermoplastic material by at least about 10° F., thus forming a thermoplastic composition having reduced temperature processing characteristics. As above, when the thermoplastic synthetic polymeric material is present in an amount of less than about 50% by weight, the thermoplastic composition may be cured to improve its overall properties.

A further embodiment of the invention relates to the thermoplastic composition produced by the inventive method. These compositions are advantageously utilized in a coated fabric article. Such articles are generally in the form of an elongated sheet and the reinforcing material is preferably a fiber of nylon, polyester, cotton, fiberglass or combinations thereof, in either a woven or knit structure.

BRIEF DESCRIPTION OF THE DRAWING FIGURE

The drawing figure (FIG. 1) is a graphical illustration of the difference in processing temperatures for various mixtures of a polyester polyurethane and linear thermoplastic millable polyurethane elastomer in accordance with a preferred embodiment of the invention as set forth in Example 11.

DETAILED DESCRIPTION OF THE INVENTION

Figure 1:
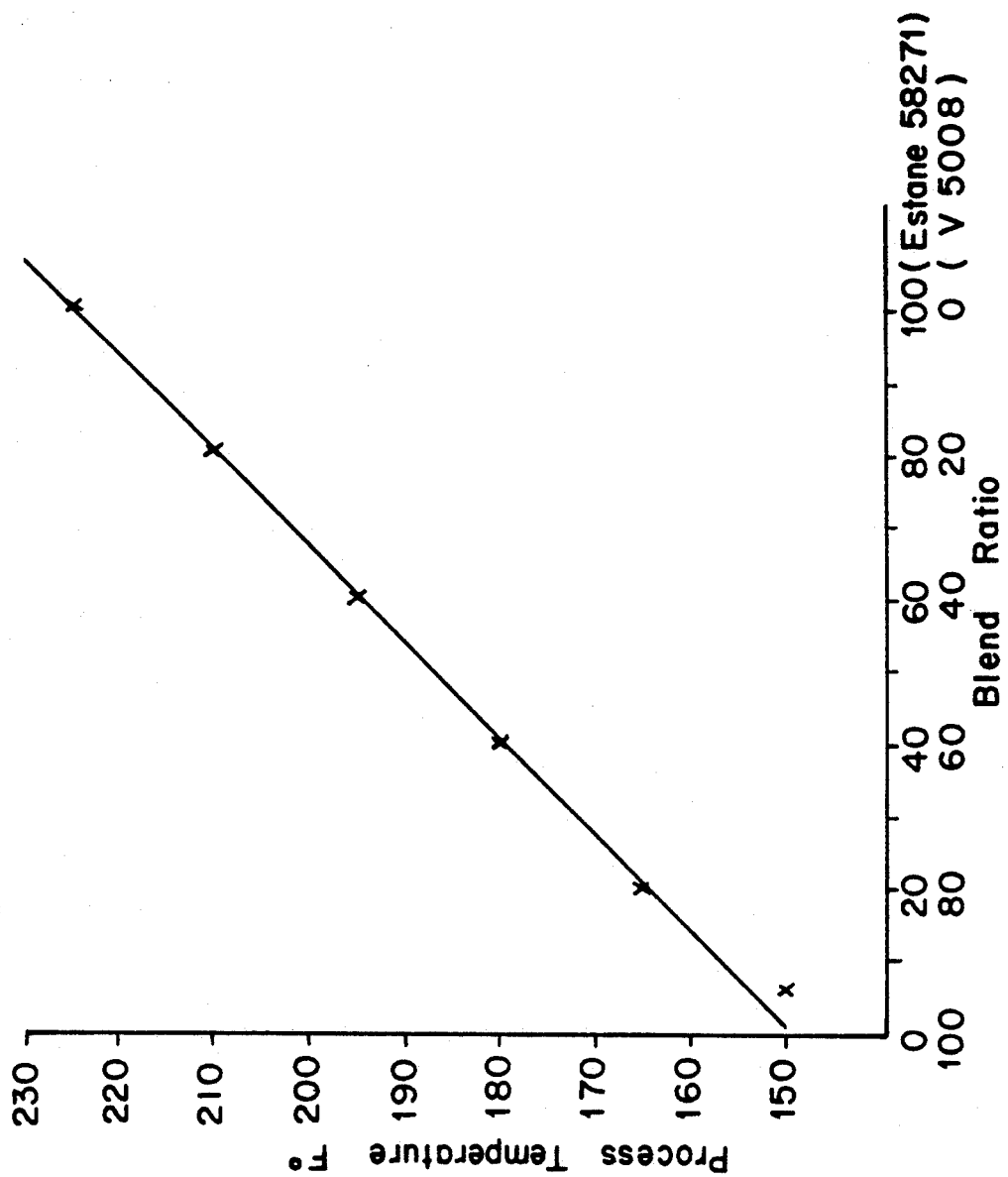

The present invention provides one method for improving the processability of many thermoplastic materials by reducing their processing temperatures such that the thermoplastic material is readily processable on conventional rubber processing equipment. This result is achieved by adding a millable thermoplastic polyurethane elastomer to the thermoplastic material to form a blend. These blends range from approximately 5 to 95 parts of the polyurethane and 5 to 95 parts of the thermoplastic material. Depending on the specific ratio selected, these blends can be processed on conventional rubber equipment ranging from cold to hot mill temperatures.

The linear thermoplastic millable polyurethane elastomer to be used in the process of the present invention includes any of the millable polyurethanes known in the art. A preferred group of suitable compounds are generally characterized as having a pendent or extra linear group which contains an aliphatic, non-benzenoid moeity. Examples of these compounds are disclosed in U.S. Pat. No. 3,043,807, the content of which is expressly incorporated herein by reference thereto. Typical millable polyurethanes include: Vibrathane V-5008 (Uniroyal Chemical), Millathane HT (TSE Ind.), Morthane CA-1217 (Morton-Thiokol), and Adiprene E (Uniroyal Chemical). The most preferred millable polyurethane is Morthane CA-1217; a linear polyurethane made by the reaction of a polyester and 4,4-diphenylmethane diisocyanate.

As noted above, the amount of linear thermoplastic millable polyurethane elastomer in the blend can range between approximately 5 and 95 parts by weight per 100 parts by weight of the total blend, with the most preferred amounts ranging from 10 to 30 parts by weight of the total blend. When amounts of greater than 50 parts of the blend is the millable polyurethane, the blend acts more like the millable polyurethane than the thermoplastic material. With this range of proportions, therefore, it is advantageous to utilize a cure package to cure the linear millable polyurethane and improve the physical properties of the blend. Such cure packages generally include sulfur compounds, and are well known by those skilled in the art of vulcanizing rubber. Particularly useful cure packages are set forth in the examples.

When greater than 50 parts of the thermoplastic material is used, the benefits and features of those materials are present, with the additional advantage of a reduced processing temperature. By "thermoplastic material," we mean a polyurethane, polyolefin, or other thermoplastic polymer which have a processing temperature of between about 150° and 325° F.

Specific thermoplastic materials covered by this invention include polyamides such as Elvamide 8062 (E. I. duPont), chlorinated polyolefins such as Alcryn (E. I. duPont), and a wide range of thermoplastic polyurethanes, including those based on polyethers, polyesters, polycarbonates or mixtures thereof. All these materials are non-reactive heat processable materials. Specific thermoplastic polyurethanes include the Estanes (B. F. Goodrich), Q-Thanes (K. J. Quinn) and Morthanes (Morton-Thiokol). Estane 5740 and 5788 are polycarbonate polyurethanes; Q-Thane PS-62 and Estane 58271 are typical polyester polyurethanes; and Q-Thane PE-88 is a typical polyether polyurethane. Blends of these polyurethanes are also suitable in the invention. For example, Morthane CA-1225 is a polyurethane formed by the reaction of an aliphatic polycarbonate and polytetramethylene glycol with an aromatic diisocyanate which is suitable for use in this invention. With respect to low temperature impact resistance, this material is preferred.

By "processing temperature," we are referring to the temperature required for converting the polymer into a product. Various processes can be used for achieving this conversion, with calendering, injection molding and extruding being three common processing operations. For example, the usual processing temperature for a thermoplastic polyester polyurethane can range between about 220° and 280° F. By the addition of a millable linear polyurethane, such as Morthane CA-1217, the processing temperature can be reduced by between 10° to 30° F. or more. This reduction is achieved because the millable linear polyurethane alone can be processed at a temperature of about 150° F. It was surprising to find that the Morthane CA-1217 is compatible with the thermoplastic materials, since its properties are quite different.

As noted above, if the thermoplastic material is present in an amount of less than 50 parts, a cure package can be utilized to crosslink and/or vulcanize the millable linear polyurethane to improve its toughness and the physical properties of the overall blend. One skilled in the art can determine by routine tests the optimum combinations of thermoplastic material, millable linear polyurethane and optional cure package to obtain the desired properties of the final product.

The products of the invention have a wide variety of end uses. The millable linear polyurethane modified thermoplastic polyurethanes can be calendered into sheets for manufacture into coated fabrics for air cells or fuel handling applications (i.e., tanks, hose and the like). For coated fabrics, the calendered sheets of the blend can be reinforced with any of the commonly used fibers including nylon, polyester, cotton, fiberglass or combinations thereof. In these applications, the thermoplastic polyurethanes in the composition are generally used in a proportion of at least 50% or more, with an 80/20 ratio being most preferred.

For some applications, a mixture of natural or synthetic fibers in mat form may be sufficient, however, it is preferred to use woven or knit blends of the various fibers. When standard weaving or knitting patterns are used, it is possible to select one type of fiber for use in one direction of the weave or knit, while another type of fiber is used in the opposite direction. Another arrangement utilizes blends of different fibers in each direction. This can be achieved, for example, by alternating strands of the synthetic and natural fibers in the weave or knit. It is also possible to blend the different fibers at the yarn level to form a composite yarn or to intimately blend such materials into a staple fiber. Then, the composite yarn or staple fiber could be used in the form of a mat, woven or knit construction. Such fabric reinforcement generally has a weight of between about 1.5 and 5.5 ounces per square yard, preferably between about 2 and 3 ounces per square yard. Those skilled in the art would understand how to select specific thermoplastic materials and reinforcement for the intended use of the article.

When the polyamides or chlorinated polyolefins are modified by incorporation of the millable linear polyurethane, the lower processing temperature of the resultant blend enables the blend to possess increased flow properties at the same processing temperature used for the unmodified material; for example, molds can be filled more rapidly in an injection molding process. This would create energy savings by reducing the cycle time for filling the mold. Alternatively, the processing temperatures could be lowered to reduce the amount of energy input into the process.

One skilled in the art would also be able to determine whether any co-agents could be used with the blends of the invention. For example, various plasticizers, compatibilizing agents, or impact modifying agents can be used to modify certain properties of the final product. Also, the molecular weight or melting point of the thermoplastic material could be increased, since its combination with the millable linear polyurethane enables the blend to attain a lower processing temperature.

It is also believed that by combining a greater proportion of the millable linear polyurethane with a lesser proportion of a thermoplastic elastomer, for example, a blend having the characteristics of the millable linear polyurethane would be achieved in a higher temperature processable material. This blend would have greater utility for further combination with one of the thermoplastic materials having a processing temperature at the higher end of the claimed range, since there would be less of a possibility of losing the lower temperature blend when mixing the components on, for example, a hot roll mill, as would occur if the temperature differential between the millable component and the thermoplastic component is too great. This problem can also be compensated somewhat by pelletizing each component and thoroughly mixing them in a banbury mixer prior to heat processing the blend.

EXAMPLES

The following examples are provided to illustrate certain preferred compositions of the invention and are not intended to limit the invention in any manner. Unless otherwise stated, all parts are given as parts by weight.

EXAMPLE 1

A typical formulation is illustrated in Table I.

TABLE I

| 80/20 polycarbonate-polyurethane/millable linear polyurethane formulation | |
|---|---|
| Compound | Amount |
| Estane 5740 × 786 | 480.0 |
| Morthane CA-1217 | 120.0 |
| Cadmium Stearate | 3.0 |
| Pigments | 25.3 |
| Cure Package (optional) | |
| MBTS | 4.8 |
| MBT | 1.2 |
| Sulfur | 1.08 |
| Caytur-4 | 0.6 |

MBT is mercaptobenzo thiazole, MBTS is mercaptobenzo thiazole disulfide, while Caytur-4 (E. I. duPont) is a mixture of MBT and zinc chloride.

To prepare this polymer blend, Part A is mixed on a rubber mill or in a banbury mixer using procedures which are well known in the art of rubber compounding. If a hot mill is used, a cure package can be added on the mill and the resulting polymer mix fed directly to a calender for sheeting out via normal calendering procedures.

The preferred method for this composition does not utilize the cure package, and includes pelletizing the banbury stock such that the blend can be extruder fed to calendering or injection molding equipment. The polymer blend prepared in this manner can be processed on a calender at a roll temperature which is about 30° F. lower than the processing temperature of the polymer without the millable linear polyurethane.

EXAMPLE 2

The following formulation was prepared in the same manner as Example 1.

TABLE II

| 80/20 polycarbonate-polyether polyurethane/millable linear polyurethane | |
|---|---|
| Compound | Amount |
| Morthane CA-1225 | 400.0 |
| Morthane CA-1217 | 100.0 |
| Cadmium Stearate | 2.5 |
| Carbon Black | 25.0 |

Again, the processing temperature was found to be about 20° F. lower than the thermoplastic polyurethane alone.

EXAMPLES 3-9

These examples show typical process temperature reductions for various thermoplastic materials blended with Morthane CA-1217. Results are illustrated in Table III.

TABLE III

| Compatibility of Morthane CA-1217 with other Polymers | | |
|---|---|---|
| Thermoplastic Material | Normal Processing Temp. | 80/20 Blend Processing Temp |
| Elvamide 8062S | 275° F. | 255° F. |
| Estane 5788 | 270° F. | 240° F. |
| Alcyrn | 250° F. | 220° F. |
| Morthane CA-1225 | 290° F. | 270° F. |
| Estane 58271 | 220° F. | 205° F. |
| Q-Thane PS-62 | 280° F. | 250° F. |

EXAMPLE 10

Table IV is a formulation illustrating a blend using 80 parts of a polyester polyurethane (Q-Thane PS-62) with 20 parts of the millable polyurethane Vibrathane V-5008.

TABLE IV

| Polyester Polyurethane Blend with Millable Polyurethane | |
|---|---|
| Compound | Amount |
| Q-Thane PS-62 | 480.0 |
| Vibrathane V-5008 | 120.0 |
| Cadmium Stearate | 3.0 |
| Uvinul D-49 (U.V. stabilizer) | 2.6 |
| Vinyzene BP 5-2 (fungicide) | 12.0 |
| Titanox 2010 (pigment) | 11.4 |
| Yellow Iron Oxide (pigment) | 16.8 |
| Black Iron Oxide (pigment) | 0.8 |
| Orange Iron Oxide (pigment) | 1.0 |
| Levapren 400 | 12.0 |
| Paraplex G-59 (plasticizer) | 30.0 |
| Cure Package (optional) | |
| MBTS | 4.8 |
| MBT | 1.2 |
| Sulfur | 1.8 |
| Caytur-4 | 0.6 |

Again, the processing temperature for the Q-Thane PS-62 polyester polyurethane was reduced by about 30° F.

EXAMPLE 11

Table V illustrates the compatibility of the millable polyurethane V-5008 with various ratios of the polyester polyurethane Estane 58271.

TABLE V

| | Compatibility of Various Ratios of Polymers | | | | | | |
|---|---|---|---|---|---|---|---|
| | Ratio | | | | | | |
| Compound | 0/100 | 5/95 | 20/80 | 40/60 | 60/40 | 80/20 | 100/0 |
| Estane 58271 | 0 | 15 | 70 | 160 | 240 | 320 | 400 |
| Vibrathane V-5008 | 300 | 300 | 280 | 240 | 160 | 80 | 0 |
| Cadmium Stearate | 1.5 | 1.5 | 1.75 | 2 | 2 | 2 | 2 |
| Carbon Black | 60 | 60 | 56 | 48 | 32 | 20 | 20 |
| Paraplex G-59 | 3 | 3 | 3.5 | 4 | 4 | 4 | 4 |
| | | | Cure System | | | | |
| MBTS | 12 | 12 | 11.2 | 9.6 | 6.4 | 3.2 | — |
| MBT | 3 | 3 | 2.8 | 2.4 | 1.2 | 0.8 | — |
| Sulfur | 4.5 | 4.5 | 4.2 | 3.6 | 2.4 | 1.2 | — |
| Caytur-4 | 1.5 | 1.5 | 1.4 | 1.2 | 0.8 | 0.4 | — |
| Tensile (PSI) | 3212 | 3333 | 2874 | 3521 | 3675 | 3164 | 4222 |
| Elongation (%) | 459 | 508 | 589 | 575 | 679 | 700 | 664 |
| Processing Temperature: (°F.) | Cold Mill | 150 | 165 | 180 | 195 | 210 | 225 |

The processing temperature for the Estane 58271 material was lowered in each case by the addition of the Vibrathane V-5008. Again, the cure system is optional.

FIG. 1 illustrates the difference in processing temperatures for various mixtures of Estane 58271 and Vibrathane V-5008. While the greatest temperature reductions are achieved with the greatest amounts of the Vibrathane material, the tensile strengths of such formulations are also reduced. This reduced strength can be compensated for somewhat by using the cure packages described above in Examples 1 or 10. Above about a 50/50 mixture (wherein the Estane predominates), a cure package does not provide significant improvements in properties: with greater than about 75% Estane 58271, the cure package actually reduces tensile strength of the mixture and for that reason would not be preferred.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A thermoplastic composition having a reduced temperature of processing consisting essentially of a mixture of:
   (a) a first thermoplastic synthetic polymeric material of a polyolefin or a polyurethane having a processing temperature in the range of between about 150° to 325° F.; and
   (b) in a sufficient amount of a second millable linear thermoplastic polyurethane elastomer having a pendent or extra linear group which contains at least one aliphatic non-benzenoid

moiety to lower the processing temperature of the first thermoplastic material by at least about 10° F.

2. The composition of claim 1 wherein the first thermoplastic material is present in an amount of between about 5 and 95 weight percent and the second polyurethane is present in an amount of between 95 and 5 weight percent, said weight percents based on the total weight of the composition.

3. The composition of claim 2 wherein the first thermoplastic material is present in an amount of between about 70 and 90 weight percent and the second polyurethane is present in an amount of between about 10 and 30 weight percent.

4. The composition of claim 1 wherein the second polyurethane is present in an amount sufficient to reduce the processing temperature of the first thermoplastic material by at least 20° F.

5. A thermoplastic synthetic polymer composition having a reduced temperature of processing comprising a mixture of:
   between about 95 and 5 weight percent of a first thermoplastic material of a polyolefin or polyurethane, said first thermoplastic material having a processing temperature in the range of between about 150° to 325° F.; and
   a second millable linear thermoplastic having at least one pendent or extra linear group which contains at least one aliphatic non-benzenoid

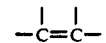

group in an amount between about 5 to 95 weight percent to lower the processing temperature of the first thermoplastic material by at least about 15° F., said weight percents based on the total weight of the composition.

6. The composition of claim 5 wherein the first thermoplastic material is present in an amount of less than about 50 weight percent, the second thermoplastic polyurethane is present in an amount of about 50 weight percent or more, and the composition further comprises an agent for curing the second thermoplastic polyurethane which is added to the mixture to improve the tensile strength properties of the overall composition.

7. The composition of claim 5 wherein the first thermoplastic material is present in an amount of between about 70 and 90 weight percent and the second polyurethane is present in an amount of between about 10 and 30 weight percent.

8. A method for reducing the processing temperature of a first thermoplastic synthetic polymeric material of a polyolefin or a polyurethane which is normally processable at a temperature between about 150° to 325° F. which comprises adding thereto in a sufficient amount of a second millable thermoplastic polyurethane elastomer having a pendent or extra-linear group which contains at least one aliphatic, non-benzenoid

moiety to reduce the processing temperature of the first thermoplastic material by at least about 10° F.

9. The method of claim 8 wherein the second polyurethane

is present in an amount of at least about 5% by weight based on the weight of the composition.

10. The method of claim 9 wherein the first thermoplastic synthetic polymeric material is present in an amount of less than about 50% by weight and which method further comprises curing the thermoplastic composition to improve its overall properties.

11. The method of claim 8 wherein the first thermoplastic polyurethane is derived from a polyol of a polyether, polyester, polycarbonate or mixtures thereof.

12. The method of claim 8 wherein the polyolefin is a chlorinated polyethylene.

13. The method of claim 8 wherein the second polyurethane is present in an amount of at least 10% so that the processing temperature of the second thermoplastic material is reduced by at least about 20° F.

14. The thermoplastic composition produced by the method of claim 8.

* * * * *